United States Patent Office 3,367,917
Patented Feb. 6, 1968

3,367,917
MELAMINE - FORMALDEHYDE - BENZOGUANA-
MINE RESIN AND PROCESS FOR PREPARING
THE SAME
Nicholas August Granito, Wallingford, Conn., assignor
to American Cyanamid Company, Stamford, Conn., a
corporation of Maine
No Drawing. Filed June 8, 1964, Ser. No. 373,568
4 Claims. (Cl. 260—67.6)

ABSTRACT OF THE DISCLOSURE

A process for the manufacture of a molding composition comprising (1) impregnating a fibrous filler with a resinous syrup of a thermosetting condensate of melamine, benzoguanamine and formaldehyde wherein the mol ratio of melamine to benzoguanamine is between about 1:0.55 and 1:0.825, respectively, and the mol ratio of the melamine and benzoguanamine to formaldehyde is between about 1:2.75 and 1:2.85, respectively, (2) drying the impregnated material to a volatile content of less than about 10%, (3) adding benzoguanamine crystal to the dried material in an amount sufficient to provide a total mol ratio of melamine to benzoguanamine between about 1:1.4 and 1:1.6, respectively, (4) comminuting and homogeneously blending the dried impregnated composition and benzoguanamine crystal, (5) densifying the comminuted composition and (6) granulating the densified composition, and the molding composition thus produced.

This invention relates to a resinous composition containing a melamine-benzoguanamine-formaldehyde resin in admixture with certain quantities of benzoguanamine per se. Still further, this invention relates to resinous molding compositions comprising a mixture of a filler impregnated with a melamine-benzoguanamine-formaldehyde resin and certain quantities of benzoguanamine crystal and to the process of preparing the same.

One of the objects of the present invention is to prepare a molding composition comprising a mixture of a filler impregnated with a melamine-benzoguanamine-formaldehyde resin and some benzoguanamine crystal. A further object of the present invention is to produce a molding composition which when converted to a molded article is capable of resisting stains from various foods and, particularly the stains of coffee, tea and the like. A further object of the present invention is to produce the molding compositions of the present invention by a technique which permits the preparation of a melamine-benzoguanamine-formaldehyde resin having a quantity of benzoguanamine in the resin syrup less than that amount ultimately desired and ultimately incorporating benzoguanamine crystal into the resinous composition and, upon conversion to a molded article, assimilate the benzoguanamine crystal into the resin molecules. These and other objects of the present invention will be discussed in greater detail hereinbelow.

It has long been known that when benzoguanamine is used to modify a melamine-formaldehyde resin in the production of molding compositions, that the ultimate molded article produced therefrom, exhibits a remarkable measure of coffee stain resistance. The U.S. Patent 2,579,985, Varela et al. issued Dec. 25, 1951, clearly illustrates that when benzoguanamine, melamine and formaldehyde are jointly used in the preparation of a resinous material, that the ultimate molded article prepared therefrom has remarkable coffee stain resistance which resistance is far superior to the coffee stain resistance of articles molded from conventional melamine-formaldehyde resins. Notwithstanding the advantages in utilizing such a molding composition to produce molded articles, particularly for tableware use, i.e. cups, saucers and the like, many difficulties had been encountered in trying to process the resin with a sufficiently high content of the benzoguanamine so as to achieve the ultimate stain resistance that the benzoguanamine is capable of imparting to the molded article. The concentration of the benzoguanamine in the resin system during coreaction and condensation is limited because a significant measure of water-solubility is required for the purpose of wet stage handling during manufacture. If the amount of benzoguanamine ultimately desired in the final resin is charged initially and the reaction with the melamine and formaldehyde carried out to the desired degree of condensation, water solubility drops off substantially and, as a consequence, the resinous syrup of diminished solubility becomes difficult to handle especially at the second stage, when it is necessary to impregnate a filler such as alpha cellulose with the resin. When the amount of benzoguanamine is reduced in the initial charge, the requisite water solubility characteristic is achieved and the alpha cellulose filler can readily be impregnated thoroughly with this resinous material but upon further processing and ultimate conversion of the molding composition to a molded article, the desired measure of coffee stain resistance is not in evidence. For these two alternative reasons, the concept of the Varela et al. discovery as indicated in the aforementioned patent, was not exploited commercially to any significant extent, since there appeared to be only two choices, each of which had an undesirable feature. By practicing the process of the present invention, one can produce a molding composition which in the earlier stages of processing, has the desired degree of water solubility so as to permit efficient handling during the filler impregnation step and in the ultimate molded article that measure of coffee stain resistance for which the Varela et al. ultimate molded article was famous.

In preparing the melamine-benzoguanamine-formaldehyde resin syrup used in the process and ultimate molding composition of the present invention, one reacts melamine, benzoguanamine and formaldehyde until a syrup is produced in which the mol ratio of the melamine to the benzoguanamine in the charge is varied between about 1:0.55 and 1:0.825, respectively, and preferably 1:0.675 melamine to benzoguanamine, respectively. The mol ratio of the melamine and benzoguanamine to formaldehyde in the initial charge may be varied between about 1:2.75 and 1:2.85, respectively, and preferably 1:2.80 melamine and benzoguanamine to formaldehyde, respectively. The syrup thus produced is substantially water-soluble and is introduced into a mixing vessel with a suitable fibrous filler such as chopped alpha cellulose and after thorough blending, the impregnated filler is then dried. If desired, during the course of the mixing of the syrup with the chopped alpha cellulose sheet, one may add curing catalyst, polymerization inhibitors and mold lubricants.

The amount of filler e.g., alpha cellulose pulp, which is blended with the melamine-benzoguanamine-formaldehyde syrup to produce the popcorn may be varied between about 25% and 42% by weight based on the total weight of filler in the popcorn and preferably about 35% by weight of filler, same basis. The amount of filler in the final molding composition may also be varied over a range between about 18% and 32% by weight of filler based on the total weight of the final molding composition and preferably about 26–29% by weight, same basis.

The drying step is accomplished usually in a continuous type oven, wherein the impregnated filler progresses in contact with hot air through the oven on an endless belt.

During the drying step and prior to the addition of the benzoguanamine crystal, the impregnated filler is dried to a volatile content of less than about 10%. The material leaves the oven in coarse granular form referred to in the art as "popcorn." To this popcorn is added the pigment material and optionally, the additives mentioned hereinabove, namely catalysts, inhibitor, mold lubricant and the like. At this point the selected amount of benzoguanamine is added so as to reestablish the mol ratio between the melamine and the benzoguanamine in order to achieve that larger amount of benzoguanamine in the final composition which will impart the coffee stain resistance to the ultimate molded article. The amount of benzoguanamine crystal added to the dried popcorn material should be sufficient to provide a total mol ratio of melamine to benzoguanamine between about 1:1.4 and 1:1.6, respectively, and preferably 1:1.55, respectively. The total composition is then ground, milled and blended in a single operation. The essential purpose of the grinding and blending operation is to comminute the popcorn to a fine particle size in the order of about 20–30 microns and at the same time uniformly blend the benzoguanamine and the pigments therewith.

In the present day practice of preparing high-grade decorative molding compositions, a ball-milling process for milling the "popcorn" and blending the pigment therewith is customarily observed. A ball-mill is a rotatable drum-like piece of equipment which carries a charge of flint or porcelain balls of the same or varying diameters. The mill is ordinarily filled to a depth of about ½–⅔ of its diameter with these grinding balls. The material to be comminuted fills the interstices between the balls and part of the free space above. As the mill rotates, all of the balls are set in motion and a substantial portion of the molding composition and balls rise along the wall of the drum to the top and cascades over the remaining portion. It is this type of action that uniquely permits the ball-mill process to mill and blend concomitantly in a single operation.

Material which has been properly blended leaves the ball-mill in a form of a very fluffy powder possessing a bulk density in the order of 0.25 g./cc. or less. This form of the composition is unsuitable for use directly as a molding material for several reasons. Firstly, because of its exceedingly bulky characteristics inordinately large and expensive molds would be required. Secondly, besides difficulties involved in handling a powder of this type, high dust losses are experienced which pose health problems and economical disadvantages. Accordingly, the art recognizes the requirement for densifying the ground, milled and blended material.

There are various ways practiced by the prior art for suitably increasing the bulk density of the product leaving the ball-mill. These include the use of such devices as the Banbury mixer, preform machines, and the like. A recent development in the art of densification, and one to which this instant invention is particularly directed, involves the use of pressure rolls to densify the product of the ball-mill. Briefly stated densification by the pressure roll method involves feeding the ground, milled and blended powder through a set of juxtaposed pressure rollers to yield a compacted form of the powder. Regardless of the type of densification employed, the bulk density of the composition is to be increased to at least about 1.0 g./cc. and preferably above 1.2 g./cc.

After proper densification of the composition as stated, the material is then granulated. Granulation is essentially a practical requirement in that it facilitates the handling of the composition by the molder. Nevertheless the extent of granulation is not completely arbitrary as it is known to those skilled in this art that the granular is required to have a minimum degree of density usually expressed as apparent density. Generally granulated compositions designed for decorative applications should possess an apparent density of at least about 0.6 g./cc. The concept of apparent density is a byword in the art, nevertheless, details concerning same may be found in ASTM D–1182–54.

The types of fillers which may be used in making such molding compositions are well known in the art and include, in addition to the alpha cellulose referred to hereinabove, such other fillers as wood flour, mineral fibers, asbestos fibers, glass fibers, chopped rag, walnut shell flour, and the like, among others. Reference is made to the U.S. Patent 3,007,885, Oldham et al., which shows some details of this art and is incorporated herein by reference to avoid redundancy.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with thermometer, stirrer, and reflux condenser, there is introduced 45.5 parts of benzoguanamine, 55.7 parts of melamine, 128 parts of a 44% aqueous solution of formaldehyde and 0.088 part of triethylamine. The pH is thereby adjusted to about 8.8 and the charge is heated to about 95–100° F. The heating is continued and at 100° F. the suspension is cloudy. Upon reaching reflux, the suspension begins to clear and becomes clear after about five minutes of reflux. The heating is continued for an additional 5 to 10 minutes at reflux (212° F.) whereupon the hydrophobe solids value is 29.0%. The syrup is then cooled to 160° F. and diluted with 8.43 parts of water. The syrup is then introduced into a mixer containing 85 parts of chopped alpha cellulose pulp. The mixture is blended thoroughly for one-half hour at about 140–145° F. and is screened onto a drier tray with a bed thickness of about three inches. The drier conditions provide an initial dry bulb temperature of about 230° F. and a dew-point temperature of 114° F. and finally down to 200°/44° F. Hot air is circulated at a rate of 5500 cubic feet/minute. The percent of pulp in the final popcorn material is about 35%. The popcorn material amounting to 55.625 parts is then introduced into a ball mill with 19.375 parts of benzoguanamine crystal together with other conventional ingredients such as mold lubricant, pigments, catalysts and the like. The grinding in the mill is continued for about 8 hours. The resulting material is then densified and granulated by conventional techniques to an apparent density of about .6 g./cc. The resulting molding composition is molded into a coffee cup and tested to determine its coffee stain resistance. The test used was comparable to that outlined in the above cited Varela et al. patent. Very good stain resistance was observed even after long periods of immersion.

*Example 2*

Example 1 is repeated in all essential details except that the benzoguanamine charge was 53.69, the melamine charge was 53.69, the formaldehyde solution charge was 135.97. The syrup thus prepared is blended with 90 parts of alpha cellulose pulp and dried in the manner of Example 1. Thereupon 58.94 parts of the popcorn material and 16.057 parts of benzoguanamine crystal were blended in the ball mill with other conventional additives. Comparable results were achieved in the ultimate molded article.

*Example 3*

Example 1 was repeated again in all essential details except that the benzoguanamine was used in an amount of 55.7 parts, the melamine 45.5 parts, the formaldehyde solution was used in the same number of parts as in Example 1. The reaction conditions and drying conditions were held constant. The dried popcorn was introduced into the ball mill in an amount of 62.00 parts and 12.89 parts of benzoguanamine crystal were added along with other conventional additives. The grinding time and conditions were the same as in Example 1.

The ultimate molded article displayed excellent coffee stain resistance even after prolonged immersion in coffee following a coffee stain resistance test comparable to that outlined in significant detail in the above-cited Varela et al. patent.

What is claimed is:

1. A process for the manufacture of a molding composition comprising (1) impregnating a fibrous filler with a resinous syrup of a thermosetting condensate of melamine, benzoguanamine and formaldehyde wherein the mol ratio of melamine to benzoguanamine is between about 1:0.55 and 1:0.825, respectively, and the mol ratio of the melamine and benzoguanamine to formaldehyde is between about 1:2.75 and 1:2.85, respectively, (2) drying the impregnated material to a volatile content of less than about 10%, (3) adding benzoguanamine crystal to the dried material in an amount sufficient to provide a total mol ratio of melamine to benzoguanamine between about 1:1.4 and 1:1.6, respectively, (4) comminuting and homogeneously blending the dried impregnated composition and benzoguanamine crystal, (5) densifying the comminuted composition and (6) granulating the densified composition wherein the amount of fibrous filler used is sufficient to provide between about 18% and 32% by weight based on the total weight of said molding composition.

2. A process for the manufacture of a molding composition comprising (1) impregnating a fibrous filler with a resinous syrup of a thermosetting condensate of melamine benzoguanamine and formaldehyde wherein the mol ratio of melamine to benzoguanamine is about 1:0.675, respectively, and the mol ratio of the melamine and benzoguanamine to formaldehyde is about 1:2.80, respectively, (2) drying the impregnated material to a volatile content of less than about 10%, (3) adding benzoguanamine crystal to the dried material in an amount sufficient to provide a total mol ratio of melamine to benzoguanamine of about 1:1.55, respectively, (4) comminuting and homogeneously blending the dried impregnated composition and benzoguanamine crystal, (5) densifying the comminuted composition and (6) granulating the densified composition wherein the amount of fibrous filler used is sufficient to provide between about 26% and 29% by weight based on the total weight of said molding composition.

3. A molding composition comprising a filler impregnated with a melamine-benzoguanamine-formaldehyde thermosetting resin dried to a volatile content less than about 10% wherein the mol ratio of melamine to benzoguanamine is between about 1:0.55 and 1:0.825, respectively, and the mol ratio of the melamine and benzoguanamine to formaldehyde is between about 1:2.75 and 1:2.85, respectively, and a quantity of benzoguanamine crystal in an amount sufficient to provide a melamine to benzoguanamine, total mol ratio between about 1:1.4 and 1:1.6, respectively, wherein the amount of filler in the molding composition is between about 18% and 32% by weight based on the total weight of said molding composition.

4. A molding composition comprising a filler impregnated with a melamine-benzoguanamine-formaldehyde thermosetting resin dried to a volatile content less than about 10% wherein the mol ratio of melamine to benzoguanamine is about 1:0.675 and the mol ratio of the melamine and benzoguanamine to formaldehyde is about 1:2.80, respectively, and a quantity of benzoguanamine crystal in an amount sufficient to provide a melamine to benzoguanamine, total mol ratio is about 1:1.55, wherein the amount of filler in the molding composition is between about 26% and 29% by weight based on the total weight of said molding composition.

References Cited

UNITED STATES PATENTS

| | | | |
|---|---|---|---|
| 2,579,985 | 12/1951 | Varela et al. | 260—67.6 |
| Re. 24,351 | 8/1957 | Varela et al. | 18—60 |

WILLIAM H. SHORT, *Primary Examiner.*

H. SCHAIN, *Assistant Examiner.*

Dedication 3,367,917.—*Nicholas August Granito*, Wallingford, Conn. MELAMINE-FORM-ALDEHYDE-BENZOGUANA-MINE RESIN AND PROCESS FOR PREPARING THE SAME. Patent dated Feb. 6, 1968. Dedication filed Mar. 4, 1983, by the assignee, *American Cyanamid Co.*

Hereby dedicates the remaining term of said patent to the Public.
[*Official Gazette June 21, 1983.*]